United States Patent

[11] 3,612,206

| [72] | Inventor | Frederick F. Ohntrup<br>Plymouth Meeting, Pa. |
|---|---|---|
| [21] | Appl. No. | 839,417 |
| [22] | Filed | July 7, 1969 |
| [45] | Patented | Oct. 12, 1971 |
| [73] | Assignee | Eaton Yale & Towne Inc.<br>Cleveland, Ohio |

[54] AUTOMATIC GUIDANCE SYSTEM FOR WAREHOUSE TRUCKS AND THE LIKE
20 Claims, 13 Drawing Figs.

[52] U.S. Cl. ..................... 180/98,
180/79.1, 318/587
[51] Int. Cl. ..................... B62d 5/04
[50] Field of Search ..................... 180/98,
79.1, 79, 2; 340/32; 318/20.220; 191/1

[56] References Cited
UNITED STATES PATENTS

| 3,039,554 | 6/1962 | Hosking et al. | 180/79.1 X |
| 3,169,598 | 2/1965 | Finn-Kelcry et al. | 180/79 |
| 3,468,391 | 9/1969 | Rushing et al. | 180/98 |
| 3,495,677 | 2/1970 | Wilson | 180/98 |
| 3,498,403 | 3/1970 | Kohls | 318/18 |
| 3,507,349 | 4/1970 | Comer et al. | 180/98 |

*Primary Examiner*—Kenneth H. Betts
*Attorney*—Teagno & Toddy

ABSTRACT: A self-steering vehicle such as a warehouse truck is guided over a preprogrammed path by guidance wires which are arranged to form an *x-y* coordinate grid. The vehicle navigates by following a first coordinate guidance wire while counting the number of second coordinate guidance wires which it crosses. When the number of crossings counted indicates arrival at a particular grid intersection where a 90° course change is required, the vehicle executes a right angle turn. Thereafter it follows one of the second coordinate wires while counting first coordinate wire crossings. A series-connected sinuous wire configuration simplifies the problems of energizing the wires, to make them detectable by inductive sensors on board the vehicle. The excitations applied to the two coordinate wires are 90° out of phase with each other, so as to cancel steering errors which would otherwise be caused by a distortion of the guidance wire fields which occurs when permeable material is in, on, or adjacent to the vehicle. The 90° course changes are accomplished by a pivotal maneuver; a special type of in-place turn which avoids losing the orientation of the vehicle relative to the guidance wires. A perpendicularity sensing circuit detects when the pivotal turn has been completed and the vehicle has been rotated into proper alignment with the next coordinate wire to be followed.

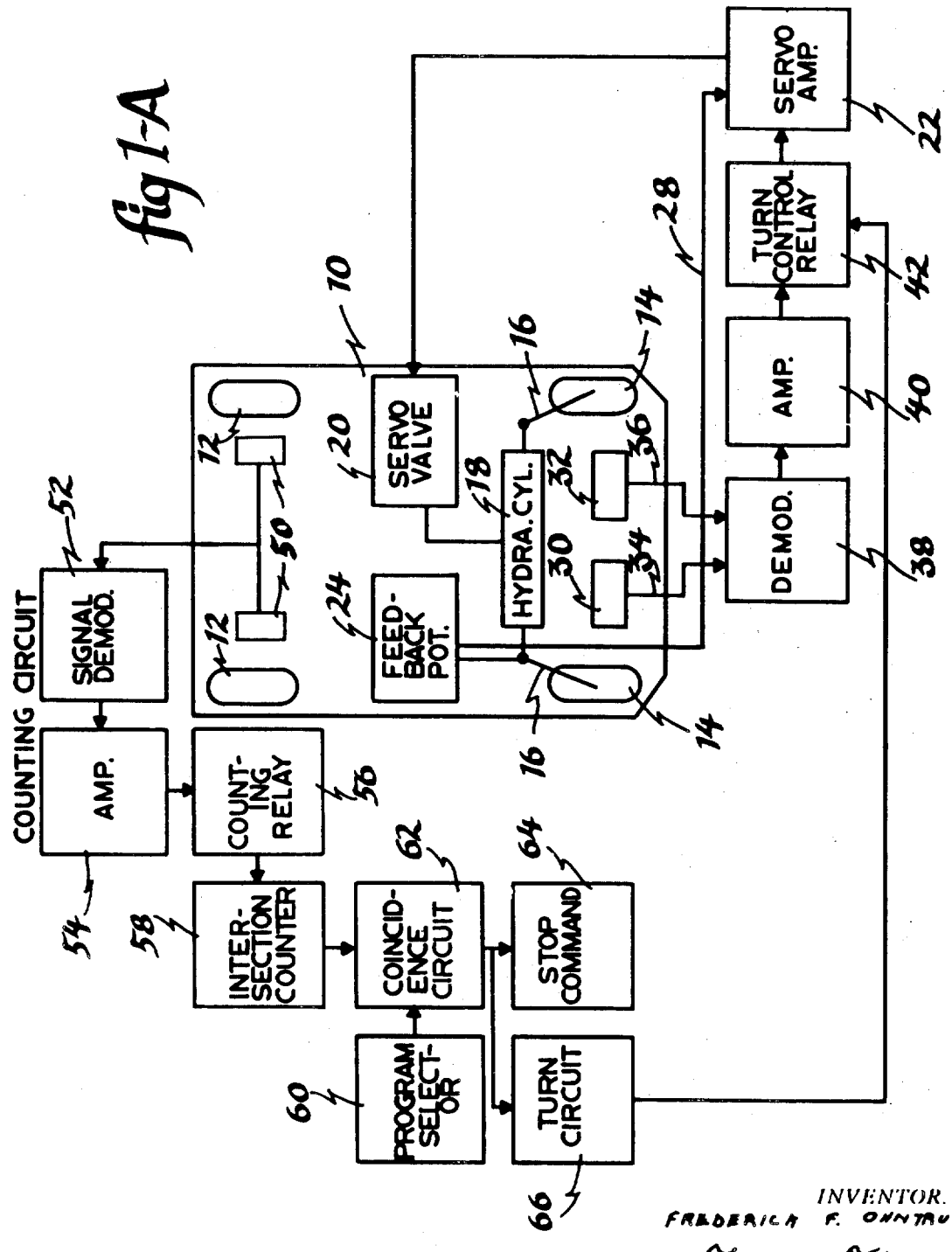

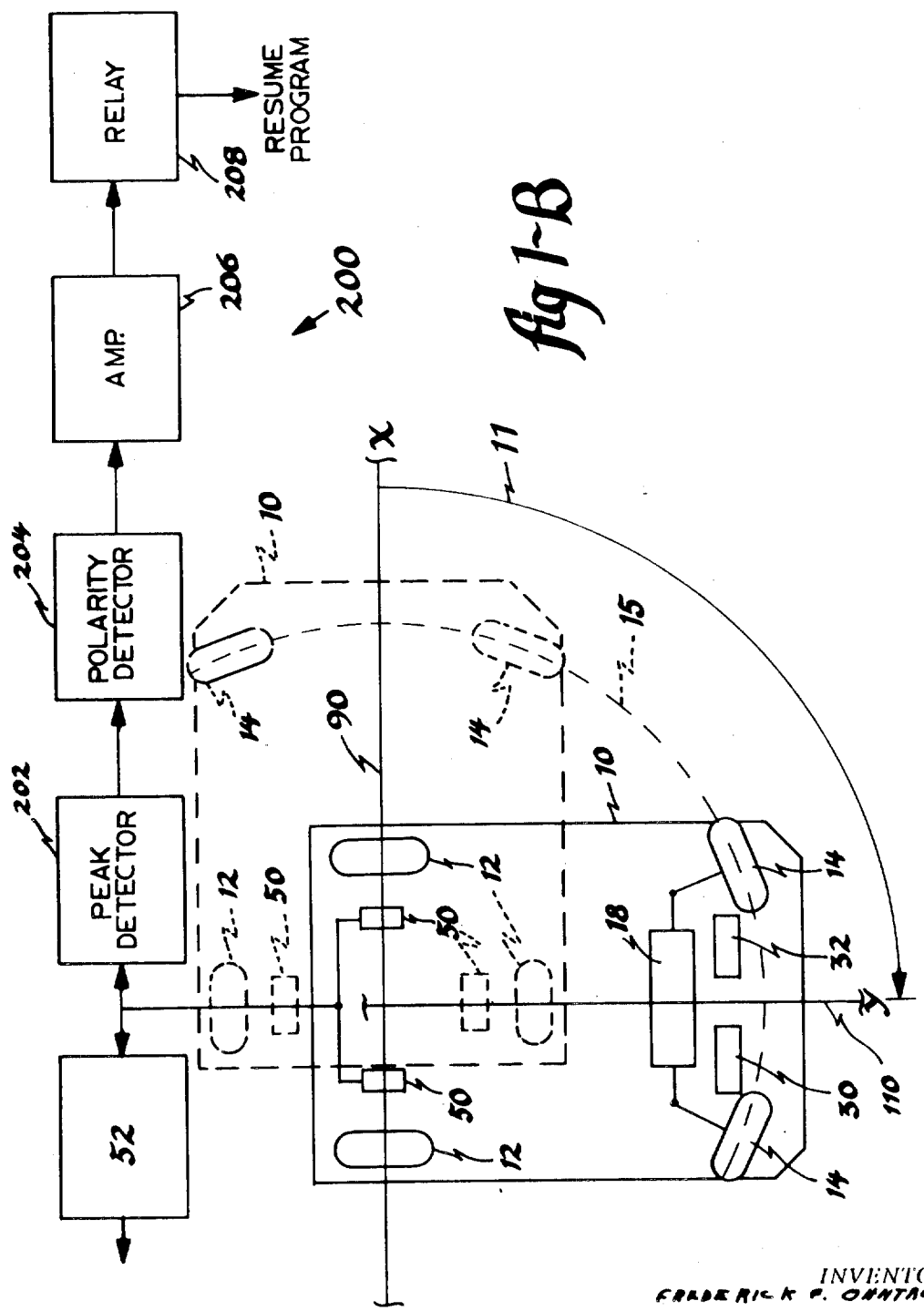

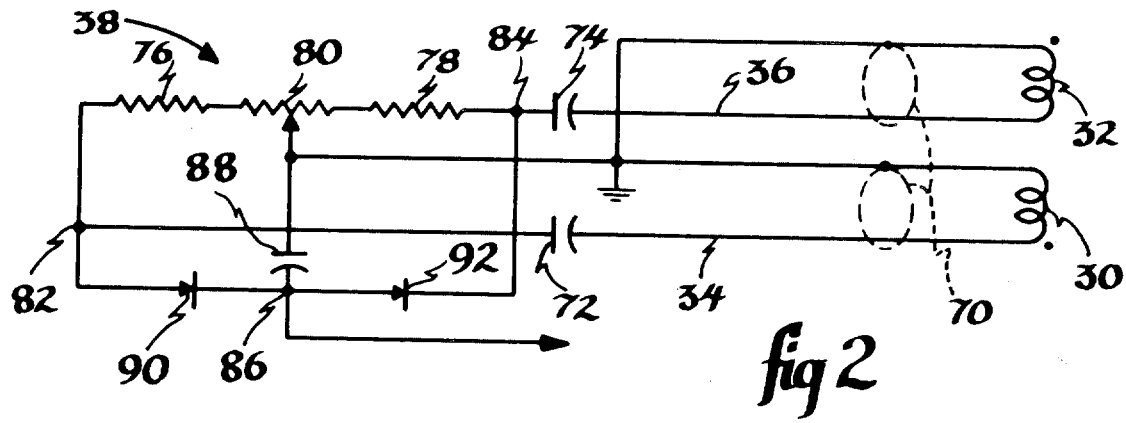
fig 2
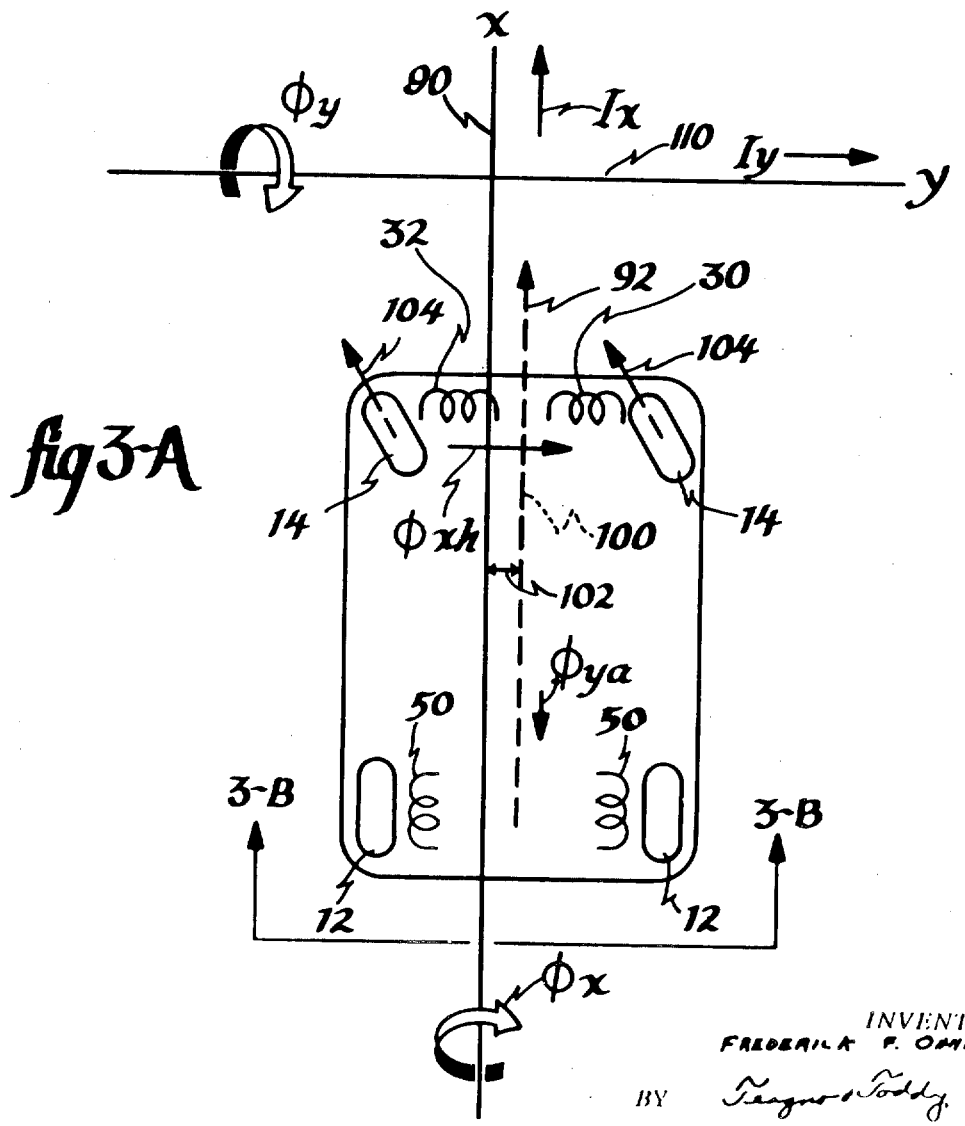
fig 3-A

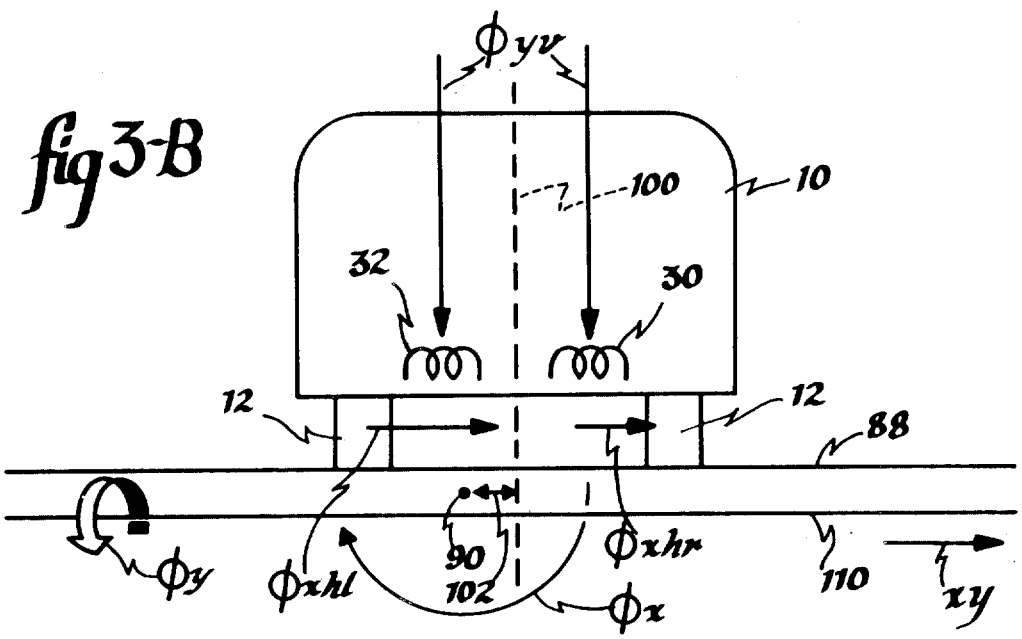
*fig 3-B*
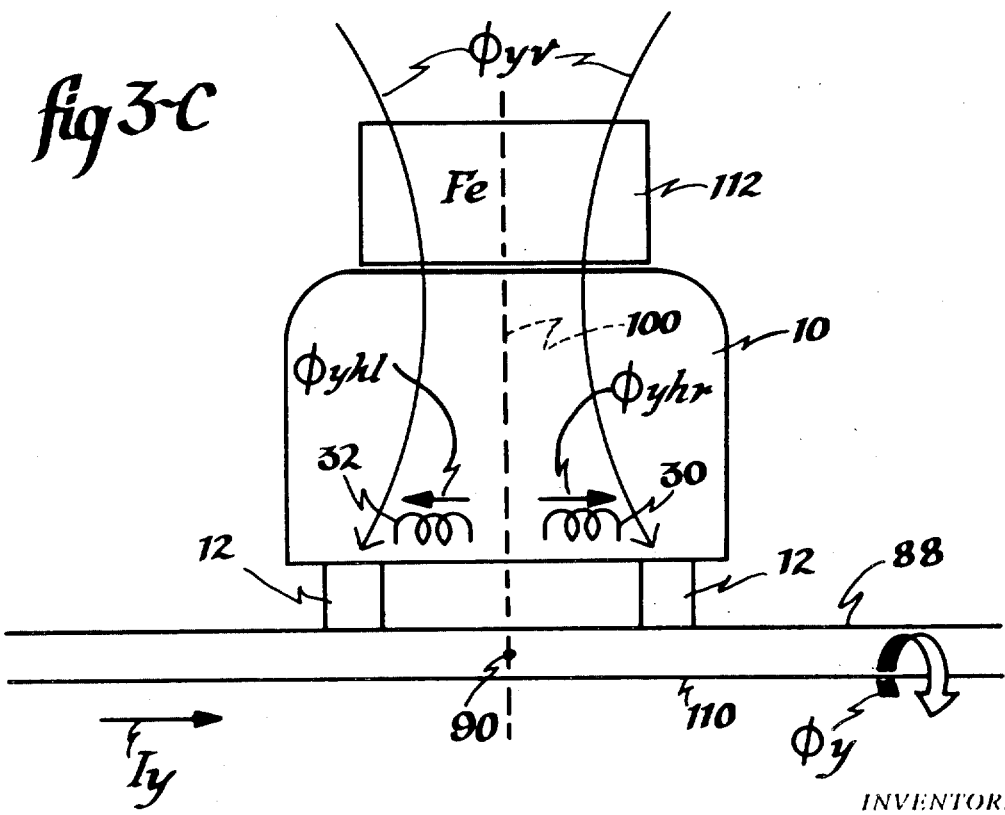
*fig 3-C*

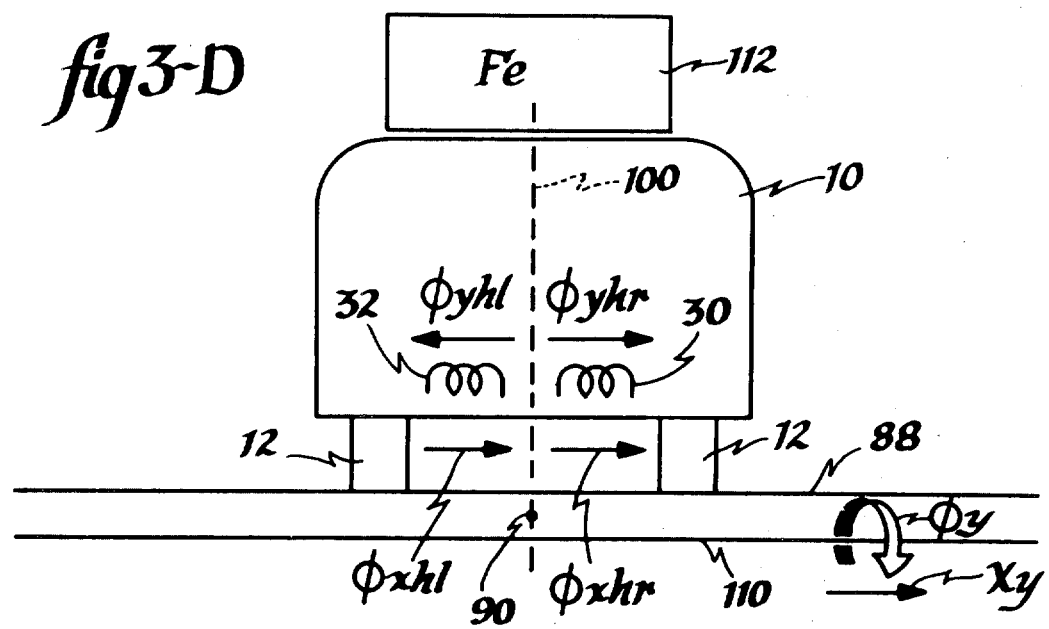
fig 3-D
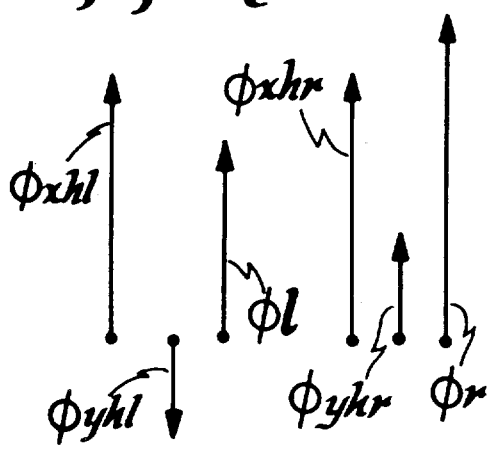
fig 4-A
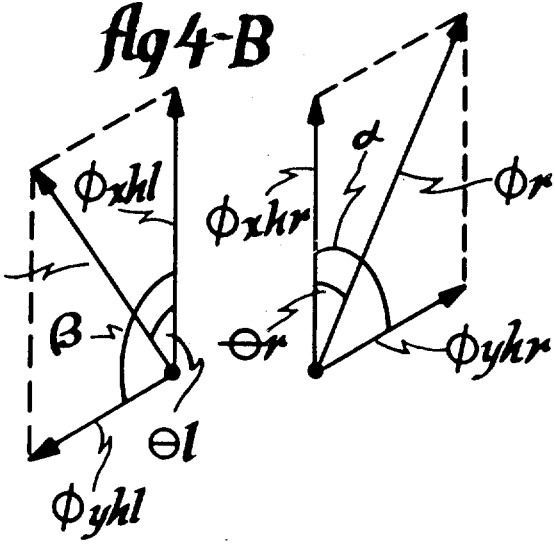
fig 4-B
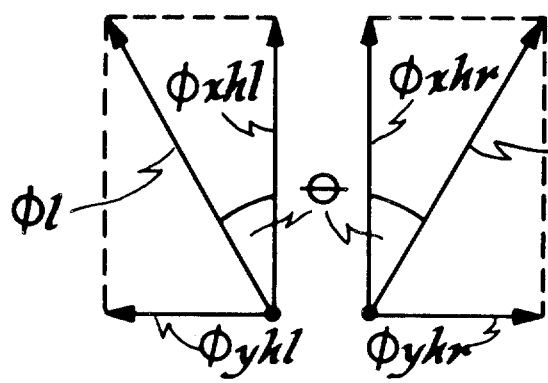
fig 4-C
INVENTOR.
FREDERICK F. ONNTRUP

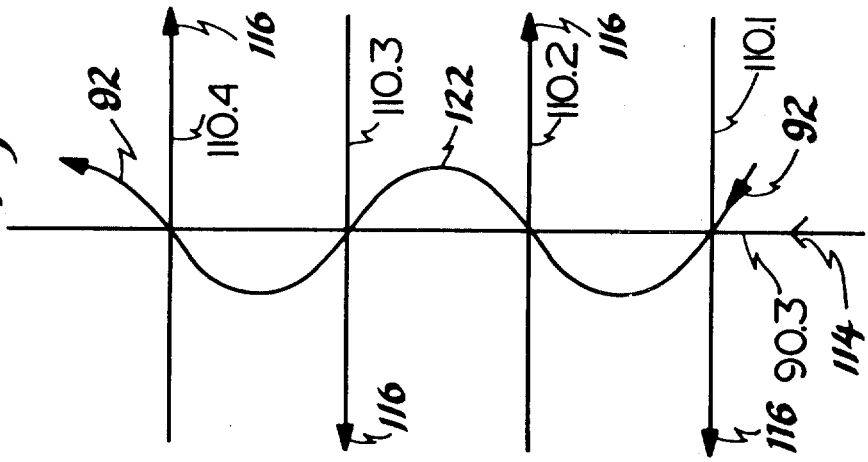
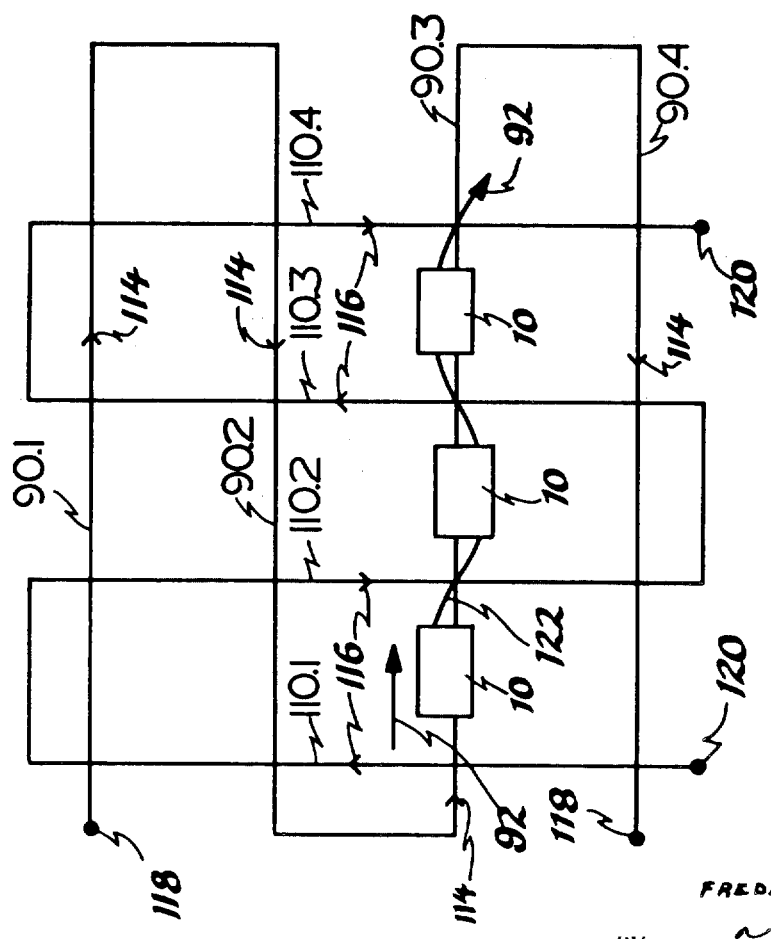

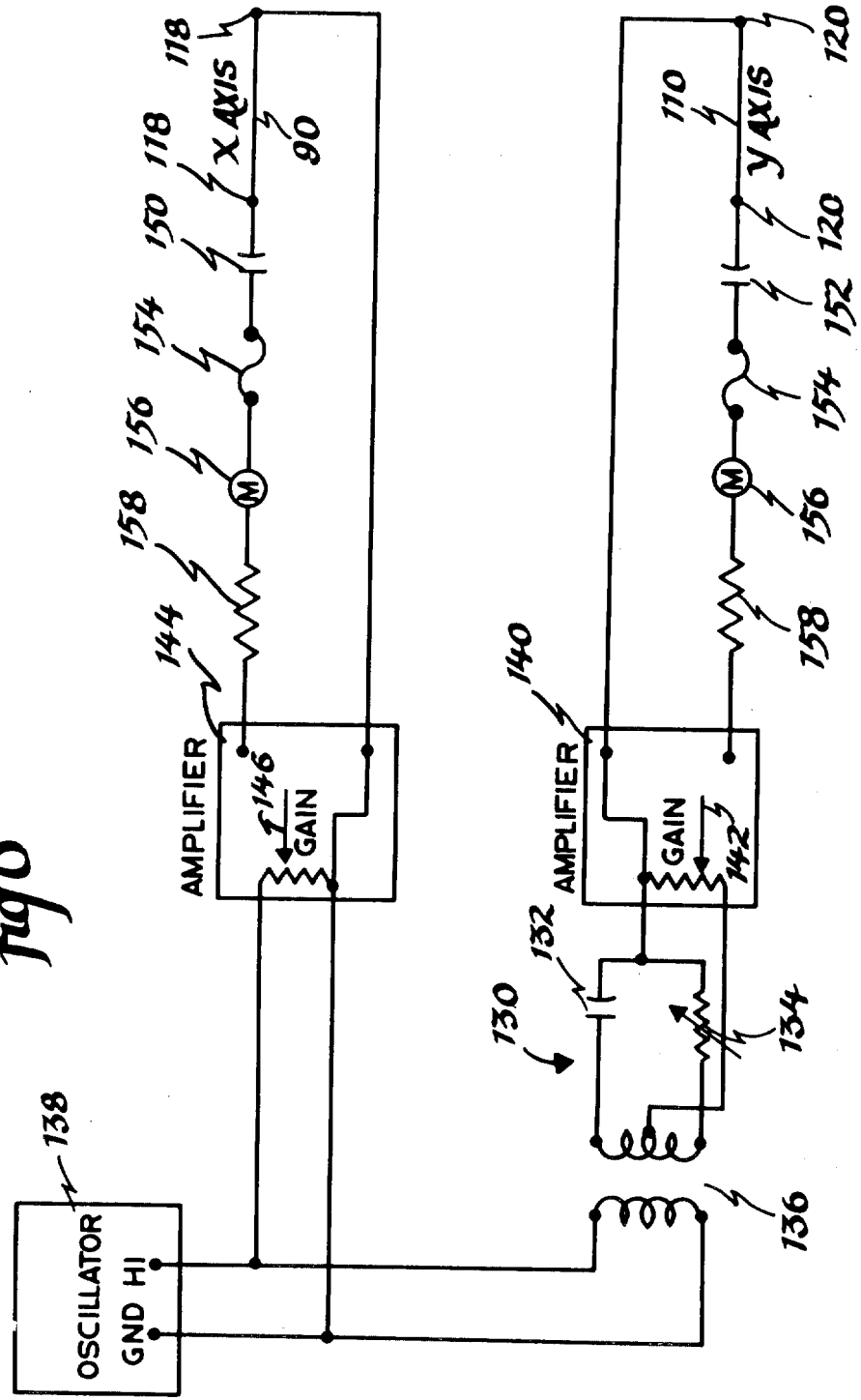

AUTOMATIC GUIDANCE SYSTEM FOR WAREHOUSE TRUCKS AND THE LIKE

FIELD OF THE INVENTION

The invention relates to automatic guidance systems for wheeled vehicles, and is particularly applicable to the guidance of automatic warehouse trucks.

THE PRIOR ART

All prior art automatic vehicle guidance systems of the type which employ guidance wires have found it necessary to distribute such guidance wires in various special-purpose continuous loop configurations. These are defined as configurations in which every route which the vehicle may have to traverse must be individually traced from start to finish, with all intermediate points in the proper order, by continuous loops consisting of a continuous guidance wire and its branches. Consequently, the guidance wire configurations of prior art systems have all the inflexibility of a fixed system of railroad tracks and sidings.

In the original design of such a system, an attempt has to be made to foresee every possible route (down to the exact sequence of intermediate points) which the vehicle will be called upon to traverse under any set of future conditions. If a new route were to become necessary after completion of the guidance wire layout, new construction would be required to add a new branch. Even a single change in the sequence of intermediate points qualifies as a "new route."

Normally, vehicle guidance wires are electrically excited to permit their detection by electromagnetic sensors on board the vehicle. This raises problems of electrical balance, which are particularly severe in continuous loop configurations requiring either that the vehicle be designed to operate over a wide range of guidance wire excitation levels, or that each of the many electrically parallel branch paths be individually trimmed by hand-adjustable impedances. Each subsequent addition of even a single new branch path then requires the retrimming of every impedance in the network.

The prior art seems never to have achieved the flexibility, nor solved the problems, of a guidance wire configuration which allows the guided vehicle to strike off along a distinct path represented by an independent electrical conductor.

SUMMARY AND OBJECTS OF THE INVENTION

The principal objective of this invention is to provide an improved vehicle guidance system, particularly one which provides maximum flexibility in routing. The invention comprises a general purpose guidance wire configuration including an $x-y$ coordinate grid, in which every possible starting point and every possible intermediate or final destination is inherently represented by a grid intersection, and every possible route is inherently traced by a particular sequence of $x$ and $y$ segments. This configuration thus has all the routing capabilities which may possibly be required under any future circumstances, within the limits of its overall dimensions and its resolution of destinations. Thus if the guided vehicle is provided with a building general-purpose grid-navigating program, it is then capable of traversing any conceivable route sequence and locating any intermediate or final destination in the guidance field.

Another object of the invention is to provide a guidance wire configuration, and a circuit connection therefor, which solves the problems of electrical balance, and avoids the need for manual trimming and retrimming.

Another important object is to solve some of the design problems which are raised for the first time by the use of an $x-y$ coordinate grid for guidance purposes. For example, as the vehicle follows one of the coordinate wires, it must have a way of determining when it reaches a particular grid intersection which defines the next desired intermediate or final destination. Therefore the invention comprises a vehicle which navigates by following a first coordinate wire while counting all second coordinate wire crossings en route to determine when a particular grid intersection has been reached.

When an intersection has been reached at which the route requires a 90° course change, the vehicle must be able to effect a right angle turn at that intersection without losing its "fix" on the guidance wires. For this reason the vehicle of this invention is capable of a pivotal turn which involves rotation about a center defined by the grid intersection, without any translational movement, which would displace the vehicle from the guidance wires.

From this discussion it is apparent that, after the vehicle effects the 90° course change, it must then strike out along a new direction, and reverse its mode of operation by following the second coordinate wire and counting first coordinate wire crossings, until the next intermediate or final destination is reached. Accordingly, the invention provides a guidance wire grid in which the wires of both coordinates, and their respective electrical excitations, are sufficiently versatile to serve either for following purposes or for counting purposes, as the need may appear.

These excitations should not be entirely identical, since experiments have shown that when a significant amount of ferromagnetic material is in the vicinity of the guided vehicle, the field of the counted wires is thereby distorted in such a way as to induce spurious corrections in the steering servo loop, which should respond only to the field of the followed wire. Accordingly, the invention provides some means of cancelling out the spurious steering corrections, as for example a phase difference between the different coordinate wire excitations.

Additional objects are to minimize the power consumed by the guidance grid, while at the same time controlling and rationalizing the coordinate wire phase relationship just mentioned. The invention simultaneously accomplishes both these objectives by tuning the grid wires to a series resonant condition, which eliminates undesired reactive components.

BRIEF DESCRIPTION OF THE DRAWINGS

FIG. 1A is a schematic block diagram of the warehouse truck of this invention, showing the wire following, intersection counting, and steering control circuitry thereof.

FIG. 1B is another schematic block diagram of the warehouse truck, showing the pivotal turn mechanism and perpendicularity sensing circuitry thereof.

FIG. 2 is a schematic electrical circuit diagram of the steering sensors and the associated demodulating circuit of the warehouse truck.

FIGS. 3A, 3B, 3C and 3D are a series of schematic diagrams illustrating the operation of the wire following system of the warehouse truck, and the manner in which a flux distortion component introduces a spurious steering correction into that system.

FIGS. 4A, 4B and 4C are a series of vector and phasor diagrams showing the effect of the distortion flux upon the steering sensors of the warehouse truck, and the manner in which such effect is eliminated in accordance with the present invention.

FIG. 5A shows a vehicle guidance wire grid in accordance with this invention, while FIG. 5B shows the wavy steering track which would be followed by the warehouse truck traversing such a guidance grid if steps are not taken to correct the spurious influences thereon.

And FIG. 6 is a schematic diagram of an electrical circuit for exciting vehicle guidance wires in accordance with this invention.

The same reference characters refer to the same elements throughout the several views of the drawing.

DETAILED DESCRIPTION OF THE PREFERRED EMBODIMENTS

FIG. 5A shows an electrically excited guidance grid configuration in accordance with this invention. The grid comprises x coordinate conductors 90.1, 90.2, etc. and y coordinate conductors 110.1, 110.2, etc. mutually intersecting in a pattern such that the intersections inherently define each intermediate and final destination in a vehicular guidance field, and the conductors inherently define every possible path between such destinations. The conductors are electrically excited, preferably by alternating energy applied to the terminals 118 and 120 so that inductive or other sensors on board the guided vehicle are able to sense the conductor fields. By thus sensing the guidance wires, the vehicle is able to follow and count these wires in order to navigate through the grid.

The individual x coordinate conductors 90.1, 90.2, 90.3, and 90.4 are all connected in series to form a continuous electrical path arranged in a sinuous pattern such that the instantaneous direction of the x coordinate exciting current alternates in consecutive conductors. For example, if the instantaneous current direction in the x coordinate wire 90.1 is to the right, it is to the left in wire 90.2, to the right in 90.3 and to the left in wire 90.4 as indicated by arrowheads 114. Similarly, the y coordinate wire 110 comprises individual conductors 110.1, 110.2 110.3 and 110.4 which are connected in series, and arranged in a sinuous pattern of alternating instantaneous current directions as shown by arrowheads 116. The advantage of the sinuous configuration is that the series connection of all the conductors in an x or y coordinate group assures identical current flow in all such conductors, without the need for individual adjustment thereof, so that the guided vehicle responds similarly to the guidance wires in any part of the grid.

FIG. 1A schematically illustrates an automatically guided warehouse truck 10 which rides on a pair of fixed rear wheels 12 and a pair of front steering and traction wheels 14. A steering linkage 16 turns the steering wheels 14 to alter the course of the vehicle, under the control of a hydraulic cylinder 18. For automatic steering of the vehicle in response to the guidance system, the hydraulic cylinder 18 is controlled by a servo valve 20 operated by a servoamplifier 22. The control loop is closed by a feedback path comprising a potentiometer 24 which senses the position of the steering linkage 16 and has an electrical connection 28 returning to the servoamplifier 22.

The vehicle 10 has two distinct systems on board for sensing the guidance wires of a coordinate grid. One system is for steering along a followed wire, and the other is for counting intersecting wires so that the vehicle can navigate to the appointed grid intersection, or destination.

The first sensing system mentioned above comprises a pair of steering sensors 30 and 32 oriented crosswise to the truck 10 and located on the right and left sides thereof respectively (right and left are stated relative to the forward direction of the truck, not relative to FIG. 1A). Thus when the truck is centered over an AC-excited guidance wire which it is following, the sensor 30 is perpendicular to, and senses, the resulting electromagnetic field on the right side of the followed wire, while the sensor 32 is perpendicular to, and senses, the resulting electromagnetic field on the left side of that wire. The outputs of the two sensors represent the right and left side field strengths respectively, and are transmitted over respective wires 34 and 36 to a demodulator circuit 38 which drives an amplifier 40. When a steering correction is required to center the truck over the followed wire, the amplifier actuates a turn control relay 42 which imparts a steering correction signal to the servo amplifier 22.

In more specific terms, as the warehouse truck 10 proceeds along the followed wire, if it wanders to the right of a centered position relative to that wire, the output of the right steering sensor 30 decreases because that sensor is moved further away from the followed wire, and the output of the left steering sensor 32 increases because that sensor is moved closer to the followed wire. Accordingly, the relationship between the outputs on leads 34 and 36 is altered in favor of lead 36. The demodulator circuit 38 responds to this alteration by changing the output potential which it applies to the amplifier 40. The direction of change is such as to cause the amplifier 40 to impart a left turn signal to the turn control relay 42, which then relays that information to the servoamplifier 22. The latter then actuates the servo valve 20 and hydraulic cylinder 18 to turn the steering wheels 14 to the left, bringing the truck 10 back into centered relationship with the followed wire. As the truck becomes centered, the original relationship between the outputs on leads 34 and 36 reappears, thus terminating the steering correction reaction.

Conversely, when the truck 10 wanders left relative to the followed wire, the output of the right steering sensor 30 increases while the output of the left steering sensor 32 decreases. The relationship between the outputs on leads 34 and 36 is then altered in the opposite direction, causing the demodulator circuit 38 to change its output potential to amplifier 40 in the opposite direction. The amplifier 40 then responds by sending a right turn signal to the turn control relay 42, with steering results which are the opposite of those described above. This sequence of events also continues until the truck 10 is brought back into centered relationship with the followed wire.

The other guidance wire sensing system includes a pair of inductive sensors 50 which are both oriented lengthwise to the truck, and thus are perpendicular and responsive to the field of the intersecting guidance wires (i.e. those which cross the path of the truck) so that the number of intersections traversed by the truck can be counted for navigation purposes. The output of the intersection counting sensors 50 is applied to a signal demodulator circuit 52 which in turn drives a threshold amplifier 54 set to respond only when the sensors 50 pass directly over an intersecting wire. The amplifier then delivers one pulse to a counting relay 56 for each wire crossing detected by the sensors 50. Each actuation of the relay 56 in turn results in one pulse to an intersection counter and storage device 58 which memorizes how many wire intersections have been traversed by the truck 10. For example, counter 58 may be a stepping relay which advances one counter per intersection.

When the truck 10 is sent out on a trip under the guidance of the wire grid, a numerical description of the desired intersection is entered into a program selector device 60. The program selector and the intersection counter 58 are both connected to a coincidence detection circuit 62 which determines when the numerical description of the desired intersection provided by the program selector 60 coincides with the numerical count of intersections registered in the stepping relay device of counter 58. When such coincidence is detected it indicates that the truck 10 has arrived at a particular intersection.

If the intersection is a final destination, the program selector 60 so advises the coincidence circuit 62, which then merely actuates a stop command circuit 64 to halt the truck 10. If the intersection is merely an intermediate turning point at which the truck must veer off 90° along the other coordinate wire, the program selector 60 requires the coincidence circuit 62 also to activate a turn circuit 66 which then drives turn control relay 42 for the purpose of effecting the desired 90° turn.

FIGS. 1A and 1B illustrate the operation of the truck during the pivotal maneuver executed for the purpose of turning 90° from one coordinate conductor to another. Suppose that, after travelling along an x coordinate conductor 90 for a time and counting y coordinate conductor intersections, the count accumulated in circuit 58 finally matches the number present in the program selector 60 when the truck 10 arrives at y coordinate conductor 110. Let us also suppose that the grid intersection 90–110 is an intermediate destination, at which the guidance program stored in circuit 60 calls for a 90° right turn in order to proceed thereafter along the y coordinate conductor 110, and count x coordinate conductors. In performing this 90° turn it is important that the required positional relationship of the intersection counting sensors 50 be transferred to the new crossing wire 90. In effect, the truck 10 should pivot in place without leaving the location defined by grid intersection 90–110.

For this reason, the truck 10 is designed to perform a purely angular turning maneuver about an axis of rotation passing through the grid intersection, without substantial translation movement away from that location. To accomplish a pivotal turn of this kind, the stop command circuit 64 is energized by the coincidence detector 62 (FIG. 1A) to brake wheels 12 of the truck to a stop at grid location 90–110. The truck is designed to halt under these circumstances with the counting sensors 50 directly over the followed wire 90, as shown by the dotted line representation in FIG. 1B, thus permitting the counting sensors to play a key role in controlling the pivotal turn.

After causing circuit 64 to stop the truck, the coincidence circuit 62 causes the turn circuit 66 to send a pivotal turn instruction to the turn control relay 42. The latter then causes the servoamplifier 22, servo valve 20, and hydraulic cylinder 18 to turn the front wheels 14. Because the steering ratios of the two front wheels 14 are at sharp variance, the inside one of these wheels, depending on the steering direction, will turn far more sharply than the outside wheel, until ultimately the wheels assume the position illustrated in FIG. 1B, in which they are both tangent to a circle 15 centered upon the grid intersection 90–110. This allows the rear end of the truck to remain in place, while the wheels 14, when driven, cause the front of the truck to pivot, as shown by the arrow 11, about an axis of rotation which passes through the grid intersection 90–110. As a result, the counting sensors 50, which start out astride wire 110 when the truck is initially in its dashed line position of FIG. 1B, rotate about the grid intersection 90–110 in such a manner as to come into precisely the same position relative to the x coordinate conductor 90 after the truck 10 has rotated a full 90° to the solid line position of FIG. 1B. Thus the counting sensors 50 are successfully transferred into the desired positional relationship relative to a new coordinate conductor, in this case the x coordinate conductor 90. Of course the sensors do not count the particular x coordinate conductor illustrated in FIG. 1B, but when thus oriented relative to that conductor they are then properly positioned for the subsequent counting of other x coordinate conductors after the truck 10 starts its forward travel along the length of the y coordinate conductor 110.

It is also apparent from FIG. 1B that the 90° rotation represented by arrow 11 also results in swinging the front end of the truck 10 into the proper position relative to the new followed conductor, y coordinate conductor 110, so that the steering sensors 30 and 32 will now straddle the new followed conductor. Accordingly, they will be in position to steer the truck 10 along the length of the wire 110 when forward motion is resumed at the conclusion of the pivotal turn maneuver.

An important aspect of this pivotal turn is the need for means which can accurately detect the completion of that maneuver. In other words, the 90° rotation of the front end of the truck 10 about the grid intersection must terminate when the longitudinal axis of the truck rotates into perpendicular relationship with the x coordinate conductor 90 and becomes parallel with the y coordinate conductor 110. For this reason there is provided a perpendicularity sensing circuit 200 which terminates the pivotal turn at the proper time. In order to accomplish this, the perpendicularity sensing circuit includes a peak detector 202 which is connected to the output of the intersection counting sensors 50. Since all the guidance grid wires, including the wires 90 and 110, are AC-excited in order to be sensed by the inductive coils of the sensors 30, 32 and 50, the outputs of these sensors depend upon proximity to the excited wires. Therefore, as the truck 10 rotates as shown by arrow 11, the upper counting sensor 50 rotates to the right away from conductor 110, and the lower counting sensor 50 rotates to the left, also away from the conductor 110. Since both sensors are moving away from the nearest exciting wire 110, their outputs decrease initially. But as the truck passes the half-way point in its 90° turning maneuver, both counting sensors 50 begin to move closer to the x coordinate conductor 90 as they go from the dashed line position to the solid line position of FIG. 1B. As the sensors approach the wire 90, their outputs increase. The peak detector circuit 202 responds to the peak of this increase, and a polarity detector circuit 204 distinguishes a positive peak from a negative peak to trigger an amplifier 206 substantially at the instant that the counting sensors 50 swing into a position just past minimum inductive coupling with the conductor 90. The amplifier 206 then turns on a relay 208 which sends a "resume program" signal to the program selector circuit 60 of FIG. 1A, signifying that the pivotal turn maneuver is completed. Then the truck 10 continues on its programmed path under control of the circuit 60, and proceeds to drive forward along the new followed wire 110, after straightening wheels 14.

It will now be appreciated that this automatic vehicle guidance system is one in which both the x and y coordinate wires of the guidance grid must both be capable of serving either as followed wires or as intersecting wires. For this reason the electrical energization applied to the x and y coordinate wires must be sufficiently alike so that the steering sensors 30 and 32 can steer along either coordinate direction alternatively, and the sensors 50 can count whichever coordinate conductor intersects the path of the truck at the moment. Such versatility must not, however, introduce any operational difficulties into the system, and preferably should be achieved without going to the expense of providing duplicate sensing equipment for travel in the two different coordinate directions. But if the identical electrical excitation is applied to both the x and y coordinate conductors, a highly undesirable type of spurious steering behavior is imposed upon the vehicle 10 as it follows either of the coordinate wires.

If the AC excitations connected across the x input terminals 118 and the y input terminals 120 are in phase with each other, the truck 10 will be subject to an alternating steering error as it follows, for example, wire 90.3 in the direction indicated by arrow 92 in FIG. 5A. As the truck 10 approaches wire 110.2, in which the instantaneous current direction is to the right, the steering error will cause it to ride to the left of the followed wire 90.3. As it recedes from wire 110.2 the steering error will cause it to ride to the right of wire 90.3. Then as the truck 10 passes beyond the influence of the wire 110.2 and comes under the influence of the next wire 110.2, in which the instantaneous current direction is to the left, the truck crosses back over to the right of wire 90.3. After the truck passes wire 110.2, it will again veer to the left of wire 90.3.

The resultant path 122 of the truck 10 as it follows the wire 90.3 appears in FIG. 5A and again in greater detail in FIG. 5B. There it is recognizable as a sinusoidal track centered on the followed wire 90.3, and crossing it at each intersection with one of the transverse wires 110. A similar wavy path will result with any other type of guidance grid configuration, unless steps are taken to eliminate the effects of the distortion flux.

To understand why this is so, we turn to the electrical circuit diagram of FIG. 2, which shows the steering sensors and associated demodulating circuitry in some detail. The steering sensors 30 and 32 are windings in which voltages are induced by the time-varying magnetic field surrounding the followed wire when the latter is excited by a voltage having an AC component. For the sake of convenient reference, let the dotted end of each winding 30 and 32 be the one which is driven positive at a particular instant. Thus, opposite polarity ends of the sensors, i.e. the positive end of sensor 32 and the negative end of sensor 30, are both connected to grounded shields 70 of respective coaxial cables leading to the demodulating circuit 38. Conversely, the positive end of sensor 30 is connected to its center lead 34 and the negative end of sensor 32 is connected to its center lead 36 of the coaxial cables. The center leads 34 and 36 are AC-coupled by respective capacitors 72 and 74 to the opposite ends of a voltage divider which is part of the demodulator circuit 38. This voltage divider includes resistors 76 and 78, and a potentiometer 80 between the resistors. Thus, the steering sensors 30 and 32 impress AC output voltages in series aiding relationship across the voltage divider 76, 80, 78.

The tap of the potentiometer 80 is connected to the grounded coaxial shields 70. As a result, the opposite ends 82 and 84 of the voltage divider are driven instantaneously negative and positive respectively, relative to ground. The output terminal 86 of the demodulator circuit 38 is connected to one side of a capacitor 88, while the other side of the capacitor is connected to the potentiometer tap and thus to ground. A diode 90 provides a first unidirectional charging path for the capacitor 88 which tends to drive the output terminal 86 positive, while a diode 92 provides a second unidirectional conducting path for capacitor 88 which tends to drive the output terminal 86 negative. The output potential appearing on terminal 86 depends upon the charging condition of capacitor 88, which in turn depends upon which polarity charging current predominates, if any.

If the capacitor charging current through diode 90 equals the capacitor charging current through diode 92, the effects of these currents are exactly balanced, capacitor 88 remains uncharged, and output terminal 86 is at ground potential by virtue of its connection to ground through an uncharged capacitor, i.e. one across which no voltage appears. Such a condition of balance occurs when the potentiometer tap is adjusted to pick off the center potential between the opposite ends of the voltage divider.

Accordingly, the demodulating circuit 38 is seen to be a balancing network connected across the sum of the outputs of the inductive sensors 30 and 32, and having a grounded center tap. When the tap is adjusted to the center voltage between circuit points 82 and 84, then the network 38 has the useful property that, so long as the magnitudes of the output voltages from windings 30 and 32 are equal, the capacitor 88 remains uncharged and the output terminal 86 is at ground potential.

On the other hand, if the magnitude of the output voltage from the right sensor 30 rises and that from the left sensor 32 falls, then the peak voltage at circuit point 82 increases, and that at circuit point 84 decreases. As a result, the capacitor charging current through diode 90 (which tends to drive output terminal 86 positive) exceeds the capacitor charging current through diode 92 (which tends to drive output terminal 86 negative). Consequently capacitor 88 becomes charged in the direction to raise the potential of output terminal 86 above ground. Conversely, if the output voltage of the left sensor 32 increases and that of the right sensor 30 decreases, the opposite situation occurs, the capacitor 88 is charged in the other direction, and output terminal 86 is driven below ground.

The center tap of the potentiometer is adjusted so that when the truck 10 is centered over the followed wire the voltages at circuit points 82 and 84 are equidistant from ground, regardless of whether or not the steering sensors 30 and 32 are exactly equidistant from the followed wire, or have exactly the same inductance, or develop exactly the same output voltage. Then ground potential at the output terminal 86 represents a centered condition, in which no steering correction is needed.

As the truck 10 drifts to the left of the followed wire, the left sensor 32 getting further away from the wire while the right sensor 30 gets closer, the magnitude of the output voltage from the left sensor decreases and that of the right sensor increases. The capacitor 88 then charges to drive the output terminal 86 above ground. This positive output represents a "-steer right" signal which is amplified by circuit 40 (see FIG. 1) and applied to the contacts of turn control relay 42. The latter relay responds to such a signal by communicating the signal to servo amplifier 22, servo valve 20 and cylinder 18 to steer the truck 10 to the right until the condition of imbalance disappears. Thus a leftward drift is corrected.

When the truck 10 drifts to the right, the opposite voltage imbalance between circuit points 82 and 84 is brought about, the current through diode 92 exceeds that through diode 90, and capacitor 88 charges in the direction to drive output terminal 86 below ground. That negative output from demodulating network 38 is then amplified by circuit 40 and applied through the turn control relay 42, to servoamplifier 22, servo valve 20 and cylinder 18 to steer to the left to correct the rightward drift.

It is now apparent that the demodulating circuit 38 is specifically designed to respond to any imbalance between the magnitudes of the output voltages of sensors 30 and 32, with the specific direction of the imbalance determining the direction of the steering correction. For an understanding of how that kind of circuit is adversely affected by the distorted magnetic field of the intersecting guidance wires, we turn to the diagrams of FIG. 3.

In FIG. 3A we are looking down in plan upon the warehouse truck 10 as it follows an $x$ coordinate conductor 90 (arbitrarily chosen) of a vehicle guidance grid. The direction of truck progress is indicated by arrow 92. The instantaneous direction of current flowing in the conductor 90 is arbitrarily assumed to be as indicated by arrow $Ix$. The instantaneous direction of the flux surrounding wire 90 therefore is as indicated by arrow $0x$. Note that the horizontal component of the flux is directed to the right in the region above the conductor 90. Since the guidance wires are imbedded in the warehouse floor, the operative portion of the $x$ coordinate flux field is a horizontal component represented by arrows $0xh$ which is instantaneously directed to the right as seen in FIG. 3A. This field of course alternates to induce voltages in both steering sensors 30 and 32, which are oriented with their axes parallel to the sensed field component $0xh$.

At the moment illustrated in FIG. 3A, the longitudinal center plane 100 of truck 10 is displaced to the right of the followed wire 90 to the extend indicated by arrow 102. Accordingly, the right steering sensor 30 is further from the followed wire 90, and the left steering sensor 32 is closer, than would be the case if the truck were centered. As a result the magnitude of the output voltage from sensor 32 is greater than that from sensor 30, causing the automatic steering system to turn the steering wheels 14 to the left as indicated by arrows 104, in order to re-center the truck 10 over the followed wire.

As the truck 10 proceeds along the followed wire 90, it crosses successive $y$ coordinate wires of the guidance grid. At the instant represented by FIG. 3A, the truck 10 is approaching an intersection between the $x$ coordinate wire 90 and $y$ coordinate wire 110. Let us assume arbitrarily that the exciting current $IY$ flowing in the intersecting wire 110 has the instantaneous direction indicated by the arrow. Accordingly, the instantaneous direction of the flux field surrounding the conductor 110 is as indicated by arrow $0Y$, i.e. it is directed horizontally toward the truck 10 in the region above the wire 110. Since the axes of sensors 50 are oriented transversely to the longitudinal axis of the truck 10, as sensors 50 cross the intersecting wire 110, flux $0ya$, which is the component of flux $0Y$ oriented horizontally and axially of the truck, induces a voltage in sensors 50 which enables the navigation system to count the intersection with wire 110 as described above.

But the flux $0Y$ is not perfectly horizontal anywhere except directly above and below the intersecting wire 110. In approaching the crossing wire 110 as seen in FIG. 3A and then receding from it, the truck 10 encounters first a downwardly directly vertical component of $0y$ and then an upwardly directed vertical component thereof. But these vertical components do not affect the operation of the counting sensor 50, because the demodulator circuit 52 (FIG. 1A) is a threshold device designated to respond only to the nearly maximum of induced voltage which occurs as the counting sensor 50 passes almost directly over the intersecting wire 110.

Nor would the vertical components of $0y$ affect the steering sensors 30 and 32, if there were no significant amount of ferromagnetic material in the vicinity of the warehouse truck 10. In FIG. 3B the truck 10 is seen from the rear as it approaches the crossing wire 110. At this instant the vertical component $0yv$ of the $y$ conductor flux $0y$ is directed downwardly, as indicated by the arrows. Since the axes of the steering sensors 30 and 32 are oriented horizontally, they are perpendicular to component $0yv$ and therefore unaffected thereby. Nor are they affected by the horizontal component $0ya$ in FIG. 3A, since the steering sensor axes are also perpendicular to that component. Thus, when undistorted by ferromagnetic material, the $y$ coordinate wire flux $0y$ has no component which can influence the steering sensors 30 and 32.

Under such conditions the steering sensors 30 and 32 would respond only to the horizontal component $0xh$ (see FIG. 3A) of the flux field $0x$ surrounding the $x$ coordinate wire. In FIG. 3B this flux component $0xh$ is represented as two separate vectors $0xhl$ on the left, which is larger and effects the left steering sensor 32, and $0xhr$ on the right which is smaller and affects the right steering sensor 30. The differential between these two vectors arises from the steering error 102, and its effect on the steering sensors is the factor which induces a steering correction for re-centering the truck 10 over the followed wire 90.

FIG. 3C shows the truck under circumstances which are similar in most respects to those of FIG. 3B, except that the truck is now centered over the followed wire 90, and it carries significant amounts of iron Fe or other ferromagnetic material. Although the iron material Fe has been shown for illustrative purposes as a load 112 carried on top of the warehouse truck 10, it will be understood that the same effects would occur if the ferromagnetic material were incorporated in the structure of the warehouse truck 10 itself or were situated nearby. Under the circumstances depicted in FIG. 3C, the material Fe distorts the vertical component $0yv$ of the field $0y$ so that the flux lines bend together near the material Fe. This causes the direction of vectors $0yv$ to slant horizontally toward each other in the region above the center of mass of the material Fe, and to slant horizontally away from each other in the region below the center of mass thereof, as seen in FIG. 3C. As a result, the left steering sensor 32 detects a horizontal component $0yhl$ of the vector $0yv$, and the right steering sensor detects a horizontal component $0yhr$ thereof. Note that these components $0yhl$ and $0yhr$ are parallel to the axes of the steering sensors 30 and 32, and therefore affect the voltage induced therein. Moreover, assuming that the center of mass of ferromagnetic material Fe is not very distant from the medial plane 100 of the truck itself, it would be expected that the directions of the components $0yhl$ and $0yhr$ affecting the left and right steering sensors respectively would be opposed; e.g. at the instant depicted in FIG. 3C, $0yhl$ is directed to the left and $0yhr$ to the right.

FIG. 3D shows a situation identical to that of FIG. 3C, except that the distortion or noise components $0yhl$ and $0yhr$ are shown in that view together with the steering signal components $0xhl$ and $0xhr$ in order to show that on the left side of the truck 10 the noise component $0yhl$ opposes the signal component $0xhl$, while on the right side of the truck the noise component $0yhr$ aids the signal component $0xhr$. Consequently, the field of the crossing wire 110, when distorted by the ferromagnetic material Fe, exerts a differential effect upon the steering sensor 30 and 32.

FIGS. 3A through 3D were arbitrarily chosen to portray the situation which exists when the warehouse truck 10 approaches a crossing wire 110 in which the instantaneous current directions in the wire 90 and 110 are as illustrated. If the truck 10 were receding from the wire 110 and the instantaneous current directions in the wires 90 and 110 were the same, or if the truck 10 approached the wire 110 but the instantaneous current direction in either wire 90 or wire 110 were the reverse of that illustrated, then the resulting vector relationship would be the reverse of that illustrated in FIG. 3D in the sense that the signal and noise components would aid each other on the left side of the truck 10 and oppose each other on the right side. It follows that as the truck 10 approaches, crosses, and recedes from each of the intersecting wires of the guidance coordinate grid, the polarity of the differential effect which the distorted field exerts upon the steering sensors 30 and 32 alternates.

FIG. 4A illustrates the effect of the noise components $0yhl$ and $0yhr$ acting differentially upon the left and right steering sensors. At the left side of FIG. 4A it is seen that the left noise components $0yhl$ is opposite in direction to the left signal component $0xhl$. The signal component $0xhl$ is much larger, since it is the local magnitude, on the left side of the truck, of the entire horizontal component $0xh$ of the field of the followed wire 90; whereas the noise component $0yhl$ is merely the horizontal distortion component of the vertical component $0yv$ of the entire field of the intersecting wire 110. Moreover, during most of the time when the truck 10 is approaching the crossing wire 110 or receding from it, the steering sensors 30 and 32 are much further from the crossing wire 110 than they are from the followed wire 90, to which the truck 10 is designed to adhere closely. At those distances the intersecting wire field $0y$ is substantially smaller than the followed wire field $0x$. Consequently, the left resultant vector $0l$ is the algebraic difference between the larger signal vector $0xhl$ and the smaller oppositely directed noise vector $0yhl$. Stated another way, the resultant vector $0l$ is in the same direction as the signal vector $0xhl$, but somewhat smaller.

On the right hand side of FIG. 4A it is seen that the signal vector $0xhr$ and the noise vector $0yhr$ affecting the right steering sensor are in the same direction. Thus when they are summed algebraically to produce the right resultant vector $0r$, the latter also is in the same direction as its signal vector $0xhr$, but in this instance is somewhat larger.

Let us know consider the effect on the demodulating network 38 when the right and left steering sensors 30 and 32 are subjected to these larger and smaller resultant induction fields $0r$ and $0l$ respectively. Under these circumstances the magnitude of the voltage output of the right steering sensor 30 exceeds that of the left steering sensor 32, causing the demodulating network 38 to react as though it were necessary to correct for a leftward steering drift. Consequently, as the truck 10 approaches the crossing wire 110 it will steer to the right of the followed wire 90, instead of centering itself thereover in the manner desired. As the truck passes directly over the crossing wire 110 there will be an instant when there is no vertical component of the crossing wire field $0y$ to be distorted by the ferromagnetic material Fe, and this steering error will diminish to zero. Then as the truck recedes from the crossing wire 110, the steering error due to the distortion field will affect the truck oppositely, and it will steer to the left of the followed wire rather than centering itself directly over it as desired.

There are a number of ways in which this spurious steering difficulty can be overcome. One solution is to apply different frequencies to the $x$ and $y$ coordinate conductors, and use filters for discrimination. Another approach is time division multiplexing of the two different coordinate excitations. However, both of these solutions increase the amount and complexity of circuitry, particularly the circuitry on board the truck, and this is especially uneconomical since many trucks may be used on each guidance grid.

FIG. 6 however, shows a preferred solution comprising a phase shift network 130 including a capacitor 132 and a variable resistance 134 connected across the secondary of a transformer 136. The primary of the transformer is energized by an oscillator 138, and the output of the phase shift network is boosted by an amplifier 140 having a gain control 142. The amplifier output is used to excite the $y$ axis guidance wires 110 connected in series between terminals 120. A similar amplifier 144 having a gain control 146 is connected directly to the output of the oscillator 138, without any phase shift network therebetween, to drive the $x$ axis conductors 90 connected in series between terminals 118. The $x$ axis and $y$ axis excitations thus have the same frequency, but the resistor 134 in the phase shift network 130 is adjusted so that the excitations are 90° out of phase with each other.

The manner in which this 90° phase difference eliminates the steering deviation problem is illustrated in FIGS. 4B and 4C. In FIG. 4B we see the effects of exciting the $y$ coordinate conductors 110 between 0° and 90° out of phase with the excitation of the $x$ coordinate conductors 90. The right noise component $0yhr$, which would otherwise be in phase with the right signal component $0xhr$ as in FIG. 4A, is now out of phase therewith by some angle alpha. The resultant flux vector $0r$ sensed by the right steering coil 30 is somewhat larger than the signal vector $0xhr$ and out of phase with it by an angle $\theta r$.

The situation perceived by the left steering coil 32 is somewhat different. There the noise vector 0yhl is out of phase with the signal component 0xhl by a larger angle beta. Since 0yhl and 0yhr are 180° apart, alpha plus beta equals 180°. The resultant flux 0l applied to the left steering sensor 32 is somewhat smaller than the signal vector 0xhl and is out of phase with it by an angle 0l.

Phase shifts such as Θl and Θr are or no consequence in the operation of the guidance system. From the discussion of FIG. 2 above, it will be appreciated that the demodulating network 38 responds only to the differential between the magnitudes of the output voltages induced in the respective steering sensors 30 and 32, and the capacitor 88 can be chosen large enough to smooth out differences in output voltage.

If the phase angle between the excitations of the y axis conductors 110 and the x axis conductors 90 is exactly 90°, then alpha=beta=° and the situation illustrated in FIG. 4C results. Since both noise components 0yhr and 0yhl are then out of phase with their respective signal components 0xhr and 0xhl by the same absolute value of phase angle, i.e. 90°, the magnitudes of the two resultants 0r and 0l are equal. Of course the 90° phase angle between signal and noise components has a negative sign on the left side of the truck and a positive sign on the right side, so that the right resultant 0r leads its signal component 0xhr and the left resultant 0l lags its signal component 0xhl (both by the same phase angle Θ). But since the demodulating network 38 is insensitive to phase, all that is necessary to eliminate the steering error arising from the distortion vectors 0yhr and 0yhl is to make them equal in magnitude as in FIG. 4C.

It is also immaterial that the resultant vectors 0r and 0l are greater in magnitude than their respective signal components 0xhr and 0xhl, because the demodulating network 38 responds not to the voltage induced in the sensors 30 and 32 as such, but to the differential between them.

Thus, when the x and y coordinate conductors 90 and 110 are energized 90° out of phase with each other, equal resultant vectors 0r and 0l induce equal voltages in the windings 30 and 32 when the truck 10 is centered over the followed wire. Even though these voltages are 90° out of phase with each other, their respective abilities to charge the capacitor 88 over a period of time of one cycle or more are equal and opposite. Therefore the output terminal 86 remains at ground potential, and no spurious steering correction is called for by the demodulating network 38 when the truck is centered over the followed wire.

On the other hand, when the warehouse truck 10 actually does wander to one side of the followed wire, then a difference will appear between the magnitudes of the output voltages induced in sensors 30 and 32, which truly reflects the steering correction required. Then the demodulating network 38 becomes unbalanced in the appropriate direction to charge capacitor 88 and produce the correct polarity of steering correction signal on output terminal 86. The phase difference between the voltages induced in windings 30 and 32 does not affect the ability of the predominating sensor voltage to charge capacitor 88 to that particular polarity.

The guidance wires 90 and 110 have a fair amount of distributed inductance. Furthermore, the oscillator 138 which excites these wires must operate at a reasonably high frequency in order for a significant level of induction to take place in the sensors 30, 32 and 50. At such frequencies, the distributed inductance of the guidance wires 90 and 110 becomes significant. Therefore capacitors 150 and 152 respectively are connected in series with the guidance wires 90 and 110 in order to tune out the undesired inductance. As a result, the elements 150, 90 and 152, 110 form respective series resonant circuits. Under these circumstances the amplifiers 144 and 140 in effect work into purely resistive loads. The advantages of this design are that less power is required for a given level of guidance wire excitation, and the phase angle between the x axis conductors 90 and the y axis conductors 110 is simply that which is selected by adjustment of the resistor 134 in network 130. Also included in the circuits of the guidance wires 90 and 110 are respective fuses 154, ammeters 156, and limiting resistors 158.

It will now be appreciated that the present invention provides a guidance system for warehouse trucks and similar vehicles which inherently traces all paths to all destinations, and which enables the vehicle to follow either coordinate wire while rejecting interference from the other coordinate wires so that the vehicle follows a straight path along the followed wire. The guided vehicle has wire following and counting sensors which enable it to zigzag through the grid over the shortest route to its ultimate destination, making tight pivotal turns in place at the intermediate turning points so as to retain its navigational fix on the nearest grid intersection. In doing so, it rotates and realigns itself perfectly with the guidance wires by means of a perpendicularity sensing circuit, which responds to the output of the counting sensors. The guidance grid conserves electrical power, needs no trimming, is electrically uniform throughout, and achieves precisely controlled phase relationships.

Since the foregoing description and drawings are merely illustrative, the scope of protection of the invention has been more broadly stated in the following claims.

The invention claimed is:

1. An automatic vehicle guidance system comprising:
  a vehicular traffic field having a grid of at least two guidance wires crossing said field and intersecting to define respective coordinates in said field;
  a vehicle having means for following a first one of said guidance wires defining a first one of said grid coordinates, and means for counting each intersection with a second one of said guidance wires defining a second one of said grid coordinates whereby to detect the arrival of said vehicle at a predetermined grid intersection; and
  means for executing a turn from said first coordinate wire to follow said second coordinate wire at said predetermined grid intersection, said turning means being arranged to perform an in-place turn about an axis of rotation passing substantially through said grid intersection.

2. A system as in claim 1 wherein:
  said grid comprises x and y conductors defining a rectangular coordinate system;
  and said turning means is arranged to turn said vehicle through a right angle from a conductor defining one of said coordinates to follow a conductor defining another of said coordinates.

3. A system as in claim 1 further comprising:
  means for detecting when said turn has been completed.

4. A system as in claim 3 wherein:
  said completion detection means is arranged to detect when the axis of said vehicle is substantially perpendicular to said first coordinate wire.

5. A vehicle adapted to be automatically guided through a coordinate grid defined by at least two intersecting guidance wires, said vehicle comprising:
  means for following a first coordinate guidance wire;
  means for counting each intersection with a second coordinate guidance wire whereby to detect the arrival of said vehicle at a predetermined grid intersection;
  sensors positioned to be on opposite sides of the followed wire when said vehicle is centered thereover;
  and vehicle steering means including a phase-insensitive balanced network which has an output terminal and is connected across said sensors so that the potential of said output terminal varies in one direction or the other when the relationship between the magnitudes of the outputs of the left and right sensors is tipped in one direction or the other respectively, and a steering mechanism which is connected to said output terminal and responsive to the direction of variation of said potential to determine the direction of variation of said potential to determine the direction in which said vehicle is steered.

6. A vehicle as in claim 5 further comprising:

means for executing a turn from said first coordinate wire to follow said second coordinate wire at said predetermined grid intersection.

7. A vehicle as in claim 6 further comprising:
programmable means responsive to said counting means for actuating said turning means when the number of intersections counted equals a predetermined quantity.

8. A vehicle as in claim 5 wherein:
said sensors are connected together with their outputs in series aiding relationship;
and said balanced network comprises a voltage divider coupled across both said sensors, an output capacitor one side of which is connected to the center potential point of said divider and the other side of which is connected to said network output terminal, providing a first unidirectional conduction path from the high potential end of said divider to said output side of said capacitor and a second unidirectional conduction path from said output side of said capacitor to the low potential end of said divider.

9. A vehicle as in claim 8 wherein:
said turning means is arranged to pivot said vehicle substantially in place whereby to remain at said grid intersection while turning.

10. A vehicle as in claim 9 further comprising:
a pair of nonsteerable wheels for rollably supporting said vehicle;
and at least one additional wheel which is pivotable for steering and rollably supporting said vehicle;
and at least one additional wheel which is pivotable for steering and rollably supporting said vehicle;
said wire-following means being arranged to drive said vehicle forward along a followed guidance wire, to sense displacement of said vehicle from said followed wire, and to pivot said steering wheel to perform a moving turn while driving forward along said wire whereby to steer said vehicle closer to said followed wire when said vehicle is diverted therefrom;
and said turning means being arranged to pivot said wheel in a manner to perform said in-place turn about an axis of rotation passing through said vehicle.

11. A vehicle as in claim 10 wherein:
there are two of said pivotable wheels for steering and rollably supporting said vehicle, and located at opposite corners at one end thereof;
and said turning means is arranged to pivot said steering wheels at different rates until both said wheels are positioned to roll about a common axis of vehicle rotation.

12. A system as in claim 10 wherein said vehicle further comprises:
means for terminating the forward drive of said vehicle during said in-place turn.

13. A vehicle as in claim 12 further comprising:
means for detecting the completion of said turn.

14. A vehicle as in claim 13 further comprising:
means responsive to said completion detector for resuming the forward drive of said vehicle after completion of said turn.

15. A vehicle as in claim 13 wherein said completion detector comprises:
means for detecting when the axis of said vehicle becomes substantially perpendicular to said first coordinate wire at the completion of said turn.

16. A vehicle as in claim 15 wherein said perpendicularity detector comprises:
means aboard said vehicle for sensing degree of proximity to said first coordinate wire, and positioned on said vehicle so as to approach closest to said first coordinate wire in the course of said in-place turn when said vehicle axis is perpendicular thereto;
and means for detecting the positive peak of the output of said proximity sensor.

17. A vehicle as in claim 16 wherein said positive peak detecting means includes:
a peak detector circuit;
and polarity-sensitive means responsive to said peak detector circuit for distinguishing a decrease from an increase.

18. A vehicle as in claim 16 wherein:
said proximity detector means also provides the input to said intersection counting means during forward drive of said vehicle.

19. An automatic vehicle guidance system comprising:
a vehicular traffic field having a grid of at least two guidance wires crossing said field and intersecting to define respective coordinates in said field;
a vehicle having means for following at times a first one of said guidance wires defining a first one of said grid coordinates, and means using the second wire for counting each intersection, with a second one of said guidance wires defining a second one of said grid coordinates whereby to detect the arrival of said vehicle at a predetermined grid intersection;
means for electrically energizing said first and second coordinate wires; and
means for rendering said first coordinate wire following means immune to the influence of the field of said second coordinate wire.

20. A system as in claim 19 wherein:
said guidance wire following means on said vehicle includes a pair of inductive sensors laterally spaced from each other on said vehicle, and vehicle steering means which are responsive to the magnitude relationship but not to the phase relationship between the outputs of said sensors when said vehicle is not centered over the followed wire to steer said vehicle in the direction to center it thereover;
and said guidance wire energizing means applies respective AC components to said first and second coordinate wires of substantially the same frequency and substantially 90° out of phase with each other and thereby rendering said first coordinate wire following means immune to the influence of the field of said second coordinate wire.